INVENTOR
ALBERT C.A.M. BLEYENBERG
ANTONIUS J. DE ROOY
ERNEST C. SCHUENZEL
REYNIER W. DAM
JOHN W. GIBSON

BY
AGENT

United States Patent Office 3,188,290
Patented June 8, 1965

3,188,290
METHOD OF MANUFACTURING A MAGNET CORE FOR USE AS A MEMORY ELEMENT
Reynier Willem Dam, Albert Cornelis Anton Marie Bleyenberg, and Antonius Johannes de Rooy, Eindhoven, Netherlands, and John Walter Gibson and Ernest Charles Schuenzel, Poughkeepsie, N.Y., assignors to North American Philips Company, Inc., New York, N.Y., a corporation of Delaware
Filed May 27, 1959, Ser. No. 816,210
Claims priority, application Netherlands, June 3, 1958, 228,379
3 Claims. (Cl. 252—62.5)

The invention relates to a method of manufacturing a magnet core to be used as a memory element. Such magnet cores have the property that the shape of the hysteresis loop approaches that of a rectangle: The memory elements are employed, for example, in electronic computers.

When using magnet cores as memory elements it is desirable to minimize the eddy currents, so that, as a raw material for these cores, use is more and more made of magnetically soft, oxidic materials, which, as is known, have a very low electrical conductivity.

The extent to which the shape of the hysteresis loop approaches that of a rectangle may be expressed quantitatively in various ways. Use may be made, for example, of the quotient $B_r/B_{c1}$, wherein $B_r$ designates the remanent inductance and $B_{c1}$ the inductance at which the hysteresis loop just closes. A different measure is the so-called "squareness ratio" $(R_s)_{max}$, i.e., the maximum value of $R_s$, which magnitude is equal to the quotient $$\frac{B_{\left(-\frac{1}{2}H_m\right)}}{B_{(H_m)}}.$$

This quotient is a function of the applied maximum field strength $H_m$. With a given value of $H_m$, the quotient attains its maximum value $(R_s)_{max}$.

The criteria determined by the aforesaid measures are, however, often not adequate to determine completely the suitability of a magnet core for use as a memory element in a computer, on account of the fact that requirements for the modern computers are gradually growing. Therefore, a measure will be used hereinafter, which applies particularly to computer elements, of which the switching time is, at the most, $5/\mu$sec.

Figure 1:
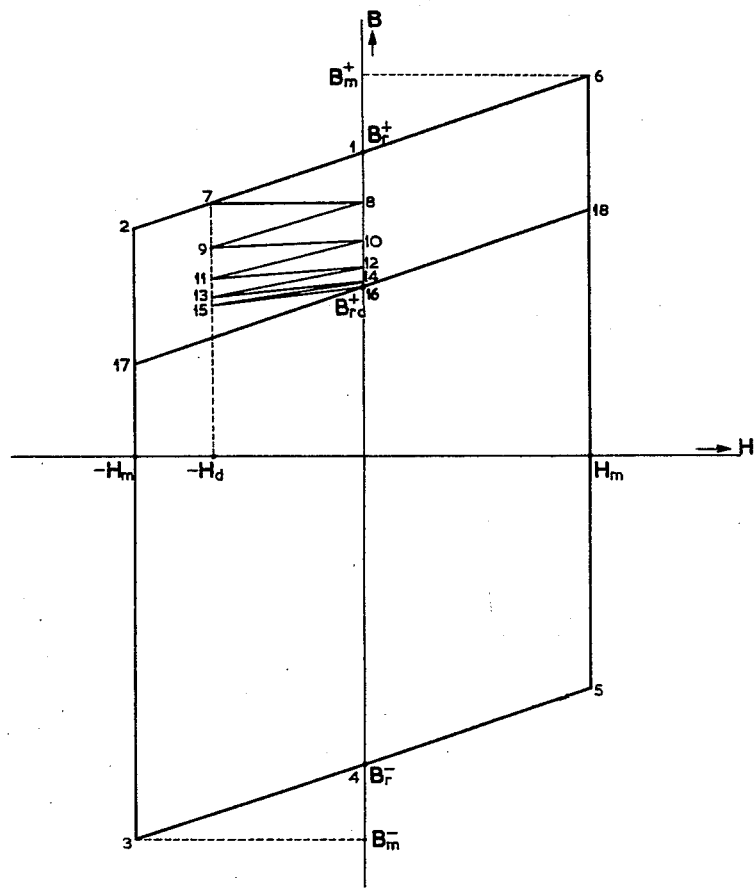

FIG. 1 shows an ideal hysteresis loop associated with a given current strength to which a field strength $H_m$ corresponds. $B_m^+$ is the maximum inductance, $B_r^+$ the positive remanent inductance, $B_r^-$ the negative remanent inductance and $B_m^-$ the minimum inductance. If the magnet core is in the state of positive remanence (1), the path 1–7–2–17–3 will be covered owing to an applied field $-H_m$. When the field is removed, the magnet core arrives in the state of negative remanence (4). With a new applied field $+H_m$, the path 4–5–18–6 is covered and after the removal of the field the core returns into the state of positive remanence (1). When a field $-H_d$ is applied, the absolute value of which is lower than the field $-H_m$, not point 2 but point 7 only is attained. When the field is removed, the core arrives again in the state of remanent inductance (8), which is lower than the initial remanent inductance $B_r^+$. When the last-mentioned process is repeated a few times, the paths 8–9–10, 10–11–12, 12–13–14 and so on are covered, until a limit value of the remanent inductance $B_{rd}^+$ (16) is attained. From this state a field $-H_m$ causes the path 16–17–3 to be covered, and a field $+H_m$ results in the path 16–18–6 being covered.

Figure 2:

FIG. 2 shows a pattern of current pulses. On the abscissa is plotted the time and on the ordinate is plotted the current strength. The absolute value of the peak value of the pulses A, B, L and V $(I_m)$ results in a magnetic field strength of an absolute value $H_m$. The absolute value of the peak value of the pulses C, D, E, F, K, M, N, O, P and U $(I_d)$ results in a magnetic field strength of an absolute value $H_d$. Between the positive pulses B and L and between the positive pulse L and the negative pulse V is comprised a number (at least 5) of negative pulses, so-called negative "disturbing pulses."

The pulse pattern of FIG. 2 is now applied to the hysteresis loop shown in FIG. 1.

After pulse A the magnet core is in the state 4 and pulse B moves it into the state 6. This results in a flux variation, which is proportional to the inductance variation $B_m^+ - B_r^-$. Thus the secondary winding has produced across it a voltage pulse $uv1$ ("undisturbed one"), of which the maximum value is designated by $uV1$.

After pulse K the magnet core is in the state 16 and pulse L moves it into the state 6. This results in a flux variation, which is proportional to the inductance variation $B_m^+ - B_{rd}^+$. Thus the secondary winding has produced across it a voltage pulse $dvz$ (disturbed zero), of which the maximum value is designated by $dVz$.

After pulse U the magnet core is in the state 16 and pulse V moves it into the state 3. This results in a flux variation, which is proportional to the inductance variation $B_m^- - B_{rd}^+$. Thus the secondary winding has produced across it a voltage pulse $rv1$ (read disturbed one), of which the maximum value is designated by $rV1$.

The suitability of a magnet core for use as a memory element of which the switching time is at the most $5/\mu$sec. has to meet the following requirements:

(1) The maximum current strength to be employed must be as low as possible, in order to require only low power; however, this requirement for the current strength may differ from case to case, in accordance with the special use;

(2) With a given ratio between the flux variations associated with $rv1$ and $dvz$, the ratio between $H_d$ and $H_m$ (between $I_d$ and $I_m$) must exceed a given value; these two ratios may differ for different uses; this criterion is more exact than a ratio between the peak values $rV1$ and $dVz$, since the shape of the voltage-time characteristic curve is not taken into account with the determination of the peak values; it is not necessary to consider also the flux variation associated with $uv1$, since this is approximately the sum of the two other variations, so that a favourable ratio between the flux variations underlying $rv1$ and $dvz$ implies a favourable ratio between the flux variations underlying $dvz$ and $uv1$, which also obtains for $rv1$ and $uv1$.

With the magnet cores manufactured by the method according to the invention the ratio between the flux variations underlying $dvz$ and $rv1$ is, at the most, 0.15 (this magnitude will hereinafter be referred to by the symbol $q$), whereas the ratio between $I_d$ and $I_m$ is, at the least, 0.61. This value of 0.61 is chosen to admit, in the use of electronic computers, current tolerances of 10% at a ratio of $I_d$ and $I_m$ of 0.5:1.

From French patent specification No. 1,128,630 ferromagnetic materials are known which have a hysteresis loop approaching the shape of a rectangle, these materials being obtained by sintering a starting mixture of a composition according to the formula:

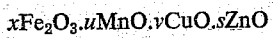

wherein the molecular percentages $x$, $u$, $v$ and $s$ fulfil the following relationships:

$$x+u+v+s=100$$
$$40 \leq x \leq 52$$

$$35 \leq u+v \leq 55$$
$$0 \leq v \leq 15 \text{ and}$$
$$0 \leq s \leq 15$$

Sintering takes place at a temperature between 900° C. and 1300° C. in an atmosphere of pure nitrogen and 0–20% of volume of oxygen. After the sintering, cooling is performed slowly in about 15 hours. The shape of the hysteresis loop is such that the ratio between the remanent inductance and the inductance associated with the applied field intensity is at least 0.9. This magnitude is approximately equal to, or at least comparable with the aforesaid magnitude $B_r/B_{cl}$.

The invention relates to a method of manufacturing an annular magnet core with an outer diameter of not more than 4 mms., particularly suitable for use as a so-called memory core in electronic computers, this core consisting of a ferromagnetic material on the basis of oxides of iron, manganese, copper and zinc by presintering, at a temperature between 500° C. and 1000° C., a mixture of a composition:

30 to 55 mol percent of $Fe_2O_3$,
30 to 65 mol percent of MnO,
0 to 15 mol percent of CuO,
0 to 15 mol percent of ZnO, wherein the oxides may be replaced by compounds yielding these oxides upon being heated, by refining the reaction product thus obtained, by moulding the powder, with or without the aid of a binder, into the form of a ring of the desired size and by sintering the ring in an oxygen-containing gas atmosphere by heating it at a temperature between 1150° C. and 1350° C., this method being characterized in that the sintered body is cooled so that at least the temperature range from 700° C. to room temperature and at the most the temperature range from 1050° C. to room temperature is traversed as rapidly as possible. The sintering preferably takes place in air. During cooling particularly at least the temperature range from 900° C. to room temperature is traversed as rapidly as possible. The duration of sintering depends upon the sintering temperature; the duration may be shorter, the higher is the sintering temperature.

As stated above, the magnet cores fulfil the condition that at a ratio between $I_d$ and $I_m$ of 0.61 the aforesaid magnitude $q$ is, at the most, 0.15. As compared with the known cores, these magnet cores fulfil a severer requirement with respect to the rectangular shape of the hysteresis loop, while the method has, moreover the advantage that its duration is materially reduced.

It should be noted that a method has been suggested to manufacture annular magnet cores with an outer diameter of not more than 4 mms., particularly suitable for use as so-called "memory cores" in electronic computers and consisting of a ferromagnetic material on the basis of oxides of iron, manganese and copper, in which the magnet core sintered in an oxygen-containing gas atmosphere by heating at a temperature between 1150° C. and 1350° C. is cooled so that, at least in the temperature range from 700° C. to room temperature, the cooling takes place in a gas atmosphere having a lower oxygen content than that of the gas atmosphere in which sintering takes place. As compared herewith the method according to the invention has the advantage that no change in the gas atmosphere is required.

*Example*

Mixtures of copper oxide, CuO, manganese carbonate, $MnCO_3$, zinc oxide, ZnO and iron oxide, $Fe_2O_3$ were ground, in water, in a ball mill, for four hours and subsequent to drying, in air for one hour. After cooling the reaction products were ground in water in a ball mill for 16 hours and then dried, after which a small quantity of an organic binder was added to the ground products. Then rings with an outer diameter of about 2.5 mms. and an inner diameter of about 1.7 mms. were moulded by compression. These rings were sintered in air for half an hour, after which they were cooled in the furnace to a given temperature. Then the rings were removed from the furnace and cooled to room temperature as rapidly as possible.

The magnet cores thus obtained were tested with one primary and one secondary winding with the aid of a pulse pattern, shown diagrammatically in FIG. 2, in which eight disturbing pulses are contained between the whole pulses. These pulses were obtained by the discharges of a capacitor via an inductor and a resistor to earth. The ratio between the disturbing currents and the whole currents was invariably 0.61. The value of the whole current was then varied to a minimum value of the aforesaid quotient $q$.

The following table indicates the method of manufacturing and the properties of these rings, i.e., the composition of the starting mixture, the presintering temperature, the sintering temperature, the temperature to which cooling is performed in the furnace, the rising time of the current pulse $(\tau_r)$, the minimum value of the quotient $q$ (which is equal to the ratio between the flux variations underlying $dvz$ and $rv1$), the value of the whole current at which the minimum value of $q$ occurs, the switching time $(T_s)$ (this is the duration of the voltage across the secondary winding at 10% of its maximum value) and furthermore the values of $uV1$, $rV1$ and $dVz$, i.e., the maximum values of $uv1$ $rv1$ and $dvz$:

By way of comparison the table indicates a magnet core cooled in the furnace from the sintering temperature to room temperature, where consequently at least the temperature range between 700° C. and room temperature was not traversed as rapidly as possible.

From the table it is evident that the value of the current at which the minimum value of $q$ occurs with the magnet cores comprising zinc is lower than with the other magnet cores.

| Mol percent | | | | Presintering temp., °C. | Sintering temp., °C. | Cooling to °C | $\tau_r$ $\mu$sec | $q$ | I mA | $T_s$ $\mu$sec | uV1 mV | rV1 mV | dVz mV |
|---|---|---|---|---|---|---|---|---|---|---|---|---|---|
| CuO | MnO | ZnO | $Fe_2O_3$ | | | | | | | | | | |
| ----- | 65 | ----- | 35 | 750 | 1,290 | 1,000 | 0.15 | 0.10 | 800 | 1.40 | 92 | 83 | 26 |
| ----- | 55 | ----- | 45 | 750 | 1,290 | 1,000 | 0.15 | 0.09 | 790 | 1.30 | 138 | 132 | 36 |
| 5 | 50 | ----- | 45 | 1,000 | 1,260 | 1,000 | 0.20 | 0.09 | 760 | 1.40 | 130 | 119 | 33 |
| 10 | 35 | ----- | 55 | 750 | 1,280 | 1,000 | 0.15 | 0.095 | 715 | 1.75 | 105 | 100 | 32 |
| 15 | 30 | ----- | 55 | 750 | 1,250 | 980 | 0.20 | 0.15 | 650 | 1.60 | 115 | 110 | 32 |
| ----- | 60 | 5 | 35 | 750 | 1,270 | 980 | 0.30 | 0.102 | 485 | 2.60 | 56 | 51 | 12 |
| 5 | 50 | 5 | 40 | 750 | 1,250 | 980 | 0.20 | 0.12 | 520 | 2.00 | 80 | 75 | 20 |
| 4 | 48 | 8 | 40 | 700 | 1,230 | 990 | 0.30 | 0.086 | 400 | 2.00 | 75 | 70 | 21 |
| 5 | 45 | 10 | 40 | 750 | 1,260 | 1,000 | 0.30 | 0.085 | 350 | 2.40 | 70 | 64 | 19 |
| 5 | 50 | ----- | 45 | 750 | 1,280 | (¹) | | 0.60 | 1,000 | | | | |

¹ Room temp.

What is claimed is:

1. A method of manufacturing an annular magnet core having an outer diameter of not more than 4 mms. and particularly adapted for use in electronic computing devices comprising the steps of forming a mixture constituted of about 30 to 55 mol percent of $Fe_2O_3$, about 30 to 65 mol percent of MnO, up to about 15 mol percent CuO, and not more than 15 mol percent ZnO, presintering said mixture at a temperature of about 500° C. to 1000° C., comminuting the presintered product, molding the comminuted product into an annular core having an outer diameter less than about 4 mms., heating the annular core in a zone having an atmosphere containing at least as much oxygen as air at a temperature of about 1150° C. to 1350° C., slowly cooling said body to a temperature of at least 700° C. and not more than 1050° C. in the heating zone, and removing the core from said zone and rapidly cooling said core in air at ambient temperature to form a core having a substantially square hysteresis loop having a ratio $I_d:I_m$ of at least 0.61, and a value of $q$ at most equal to 0.15, where $I_m$ is the peak value of a current pulse at which a magnetic field is produced in the core having a value of $H_m$, $I_d$ is the peak value of a current pulse at which a magnetic field is produced in the core having a value $H_d$, $H_m$ being the magnetic field which produces a flux density $B_m$ at which the hysteresis loop closes and $H_d$ has a value less than $H_m$ and at which a remanent flux density $B_{rd}^+$ is produced which is the limit value of remanent flux density when a field $-H_d$ is successively applied and removed from the core, $q$ is a ratio between flux variations underlying $dvz$ and $rv1$, $dvz$ being a voltage pulse proportional to $B_m^+ - B_{rd}^+$ where $B_m^+$ is the maximum flux density at which the hysteresis loop closes, and $rv1$ is a voltage pulse proportional to $B_m^- - B_{rd}^+$ where $B_m^-$ is the remanent flux density after a field $-H_m$ is removed.

2. A method as defined in claim 1 in which the annular core is heated in air.

3. A method as defined in claim 1 in which the body is cooled to a temperature of about 900° C. in the heating zone and, thereafter cooled as rapidly as possible outside the heating zone.

References Cited by the Examiner

UNITED STATES PATENTS

| | | | |
|---|---|---|---|
| 2,549,089 | 4/51 | Hegyi | 252—62.5 |
| 2,723,238 | 11/55 | Simpkiss | 252—62.5 |
| 2,818,387 | 12/57 | Beck et al. | 252—62.5 |
| 2,856,365 | 10/58 | Heck et al. | 252—62.5 |
| 2,905,641 | 9/59 | Esveldt et al. | 252—62.5 |
| 2,950,251 | 8/60 | Weisz | 252—62.5 |
| 2,982,732 | 5/61 | Brownlow | 252—62.5 |
| 2,988,508 | 6/61 | Geldermans et al. | 252—62.5 |
| 3,028,336 | 4/62 | Eichbaum | 252—62.5 |

FOREIGN PATENTS

| | | |
|---|---|---|
| 1,084,180 | 7/54 | France. |
| 1,120,702 | 4/56 | France. |
| 1,128,630 | 8/56 | France. |
| 1,171,294 | 9/58 | France. |

OTHER REFERENCES

Fresh, Proceedings of the IRE, October 1956, pages 1303–1311.

MAURICE A. BRINDISI, *Primary Examiner.*

JULIUS GREENWALD, *Examiner.*